United States Patent
Lilligreen et al.

(10) Patent No.: US 10,914,356 B2
(45) Date of Patent: Feb. 9, 2021

(54) HYDRAULICALLY DAMPING MOUNT

(71) Applicant: VIBRACOUSTIC GMBH, Darmstadt (DE)

(72) Inventors: Michael Lilligreen, Worms (DE); Jan Philipp, Einhausen (DE); Thomas Schemer, Weinheim (DE); Timo Stöcker, Hemsbach (DE)

(73) Assignee: VIBRACOUSTIC GMBH, Darmstadt (DE)

( * ) Notice: Subject to any disclaimer, the term of this patent is extended or adjusted under 35 U.S.C. 154(b) by 0 days.

(21) Appl. No.: 16/346,976

(22) PCT Filed: Nov. 2, 2017

(86) PCT No.: PCT/EP2017/078059
§ 371 (c)(1),
(2) Date: May 2, 2019

(87) PCT Pub. No.: WO2018/083178
PCT Pub. Date: May 11, 2018

(65) Prior Publication Data
US 2020/0063820 A1    Feb. 27, 2020

(30) Foreign Application Priority Data
Nov. 3, 2016 (DE) .......................... 10 2016 120 959

(51) Int. Cl.
*F16F 13/10* (2006.01)
*B60K 5/12* (2006.01)

(52) U.S. Cl.
CPC .......... *F16F 13/106* (2013.01); *B60K 5/1208* (2013.01); *F16F 2224/0225* (2013.01)

(58) Field of Classification Search
CPC ........ F16F 13/10; F16F 13/105; F16F 13/106; F16F 2224/0225; B60K 5/1208
See application file for complete search history.

(56) References Cited

U.S. PATENT DOCUMENTS

| 4,657,232 A | * | 4/1987 | West | F16F 13/26 267/140.13 |
| 4,986,510 A | * | 1/1991 | Bellamy | F16F 13/106 248/636 |

(Continued)

FOREIGN PATENT DOCUMENTS

| CN | 201326679 Y | 10/2009 |
| CN | 102149941 A | 8/2011 |

(Continued)

OTHER PUBLICATIONS

International Search Report PCT/EP2017/078059, dated Feb. 9, 2018.

(Continued)

*Primary Examiner* — Thomas W Irvin
(74) *Attorney, Agent, or Firm* — Fishman Stewart PLLC

(57) ABSTRACT

A hydraulically damping mount for mounting a motor vehicle unit, such as mounting a motor vehicle engine on a motor vehicle body, includes a supporting spring and a compensation chamber. The supporting spring is configured to support a mount core and surround a working chamber. The compensation chamber is separated from the working chamber by a dividing wall and delimited by a compensation diaphragm. In embodiments, the compensation chamber and the working chamber are filled with a fluid and are connected to each other by a damping duct incorporated into the dividing wall. In embodiments, the dividing wall includes a diaphragm that is capable of oscillating, and a foam element associated with the diaphragm supports the diaphragm in the event of a deflection.

12 Claims, 2 Drawing Sheets

(56) References Cited

U.S. PATENT DOCUMENTS

| | | | | |
|---|---|---|---|---|
| 5,443,245 A | * | 8/1995 | Bellamy | F16F 13/106 267/140.13 |
| 6,296,237 B1 | * | 10/2001 | Nagai | B60G 7/04 267/140 |
| 8,439,335 B2 | * | 5/2013 | Kim | F16F 13/20 267/140.13 |
| 8,678,360 B2 | | 3/2014 | Yamamoto et al. | |
| 9,033,319 B2 | * | 5/2015 | Kim | F16F 13/08 267/140.14 |
| 9,416,843 B2 | | 8/2016 | Lemaire et al. | |
| 2010/0001447 A1 | * | 1/2010 | Kim | F16F 13/20 267/140.11 |
| 2019/0234481 A1 | * | 8/2019 | Lilligreen | F16F 13/268 |

FOREIGN PATENT DOCUMENTS

| | | | | |
|---|---|---|---|---|
| CN | 104847837 A | | 8/2015 | |
| DE | 102007014710 A1 | | 10/2008 | |
| DE | 102010060886 B4 | * | 7/2018 | F16F 13/10 |
| JP | 20043656 A | | 1/2004 | |

OTHER PUBLICATIONS

Chinese Search Report, 2017800512406, dated Jul. 14, 2020.
Translation of CN Office Action, 201780051240.6, dated Aug. 5, 2020.

\* cited by examiner

HYDRAULICALLY DAMPING MOUNT

CROSS-REFERENCE TO RELATED APPLICATIONS

This application is a National Stage Patent Application of International Patent Application No. PCT/EP2017/0708059, filed Nov. 2, 2017, which claims the benefit of German Application Serial No. 10 2016 120 959.7, filed Nov. 3, 2016, the contents of each are incorporated by reference in their entireties.

TECHNICAL FIELD

The invention relates to a hydraulically damping mount for mounting a motor vehicle unit, in particular for mounting a motor vehicle engine, on a motor vehicle body, comprising a supporting spring supporting a mount core and surrounding a working chamber, and a compensation chamber separated from the working chamber by a dividing wall and delimited by a compensation diaphragm, wherein the compensation chamber and the working chamber are filled with a fluid and are connected to each other by a damping duct incorporated into the dividing wall, and wherein the dividing wall has a diaphragm accommodated in a manner capable of oscillating.

BACKGROUND

Such hydraulically damping mounts are also referred to as hydromount and serve, in particular, for supporting a motor vehicle engine on a motor vehicle body in order to, on the one hand, dampen the vibrations caused by road bumps and, on the other hand, to provide insulation against acoustic vibrations. For example, the supporting spring consisting of an elastomeric material effects an acoustic insulation. The vibrations caused by road bumps are dampened by a hydraulic system, with the hydraulic system being formed by the fluid-dampened working chamber, the compensation chamber, and the damping duct connecting the two chambers with each other.

The working chamber is made larger or smaller by a movement of the supporting spring, whereby a hydraulic pressure is built up in the working chamber. Due to the pressure, the fluid located in the working chamber is pressed via the damping duct into the compensation chamber. Due to the small diameter of the damping duct and the high mechanical transmission associated therewith, which results from the equivalent displacing cross section of the supporting spring in relation to the damping duct cross section, the introduced vibrations are absorbed or damped.

In order to decouple high-frequency, low-amplitude vibrations, i.e. in the acoustically relevant range, the incorporation of an elastic diaphragm within the dividing wall is known. In this case, the diaphragm oscillates at high-frequency, low-amplitude oscillations, so that an increase in the dynamic stiffness of the mount can be reduced considerably.

In idle operation of the engine, a reduction of the dynamic stiffness smaller than the static stiffness of the mount is desirable. In contrast, a high level of stiffness of the mount is demanded for driving operation in order to obtain the required damping properties. In this regard, it is known to provide the hydraulically damping mount with a switching device for the diaphragm, with which the mount can be adapted to a driving operation or an idle operation of the engine. For example, this switching device can be realized by means of an air chamber, which is disposed underneath the diaphragm and is filled with air or evacuated in a switchable manner.

Thus, the damping of oscillations at certain amplitudes is generally accompanied by an increase in dynamic overall stiffness. If low dynamic stiffness is desired, the effectivity of the damping duct is limited in equal measure. Usually, however, the two states cannot occur simultaneously.

SUMMARY

The invention is based on the object of providing a hydraulically damping mount which has a particularly low dynamic overall stiffness despite the damping action.

A hydraulically damping mount with the features of claim 1 is proposed for achieving the object. Advantageous embodiments of the hydraulically damping mount are the subject matter of the dependent claims.

In the mount according to the invention, the foam element supports the diaphragm in the event of a deflection. In the process, the foam element generates sufficient stiffness in the damping system for a damping effect to occur at a certain set frequency. In addition, the combined stiffness of the system diaphragm/foam element is sufficiently low above the resonance frequency of the mount to reduce the stiffness of the supporting spring.

Thus, the physical properties of the foam element permit both a high level of damping as well as a low stiffness in the mount, without the side effects or drawbacks that the respective states would usually have.

Advantageously, the foam element is compressed by the diaphragm oscillating.

Oscillations acting on the hydraulically damping mount are absorbed by the supporting spring and cause the working chamber to become larger or smaller. Thus, a hydraulic pressure is built up in the working chamber. For the set frequency range, the pressure built up in the working chamber is transmitted onto the diaphragm. In this case, the foam element and the diaphragm have a stiffness that is sufficiently high for the foam element to support the diaphragm in a manner incapable of oscillating. Consequently, the fluid is forced through the damping duct and produces a damping action.

From an adjustable pressure limit in the working chamber, the stiffness of the foam element and the diaphragm is not large enough for the foam element to support the diaphragm in a manner incapable of oscillating. Consequently, the diaphragm oscillates. The level of the pressure limit can be adjusted by means of the stiffness of the foam element and the diaphragm. The foam element is compressed by the diaphragm oscillating. Thus, the diaphragm is given room for oscillating. In this case, however, the stiffness of the foam element and the diaphragm is so low that the dynamic overall stiffness can be set to a value similar to the state without a damping action.

Advantageously, the damping properties of the mount can be adjusted by means of the Shore hardness of the foam element.

Advantageously, the foam element is accommodated in a chamber. The latter can be incorporated into the dividing wall or a mount cup.

In an advantageous embodiment, the chamber is sealed at one end face by the diaphragm.

In an advantageous embodiment, the foam element consists of a closed-cell foam. In contrast to an open-cell foam element, a closed-cell foam element is water-repellent. Thus, moisture that may enter cannot be absorbed by the foam element. In an advantageous embodiment, the foam element is formed from a PU foam, in particular a micro-cellular foam (MCU).

The foam element may consist of a polyurethane foam, in particular of a micro-cellular foam (MCU).

In an advantageous embodiment, an opening associated with a switch valve is provided on the chamber. The chamber can be filled with air in a controllable manner through the opening on the chamber, with which a switch valve is associated. The air is preferably drawn directly from the environment of the hydraulically damping mount.

The foam element is compressed in such a way, when the diaphragm oscillates, that an empty space is created in the chamber. During the course of the oscillation, this space becomes larger in a radially outward direction as well as axially, in the direction of the oscillation of the diaphragm. If the created space is filled with air via the opening and the switch valve, this decouples the diaphragm from the foam element for a short time and thus reduces the stiffness of the system diaphragm/foam element. Thus, the dynamic overall stiffness of the hydraulically damping mount can be reduced.

In an advantageous embodiment, the foam element is formed with the shape of a hollow cylinder.

BRIEF DESCRIPTION OF THE DRAWINGS

The invention is explained in more detail below with reference to exemplary embodiments that are schematically shown in the Figures. In the Figures.

DETAILED DESCRIPTION

Figure 1:
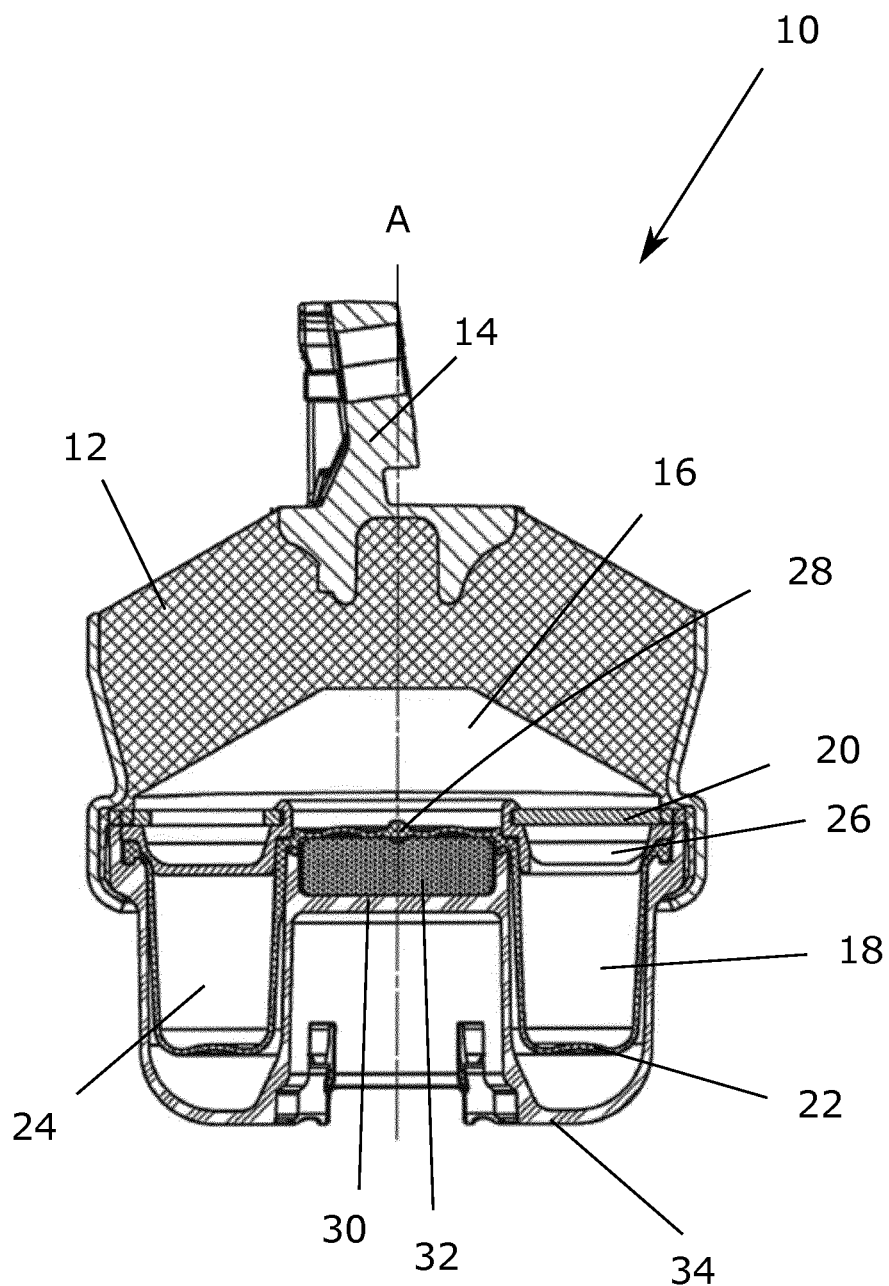
FIG. 1 shows a cross-sectional view of an exemplary embodiment of the hydraulically damping mount.

FIG. 1 shows a hydraulically damping mount 10 with a supporting spring 12 supporting a mount core 14 and surrounding a working chamber 16. Furthermore, a compensation chamber 18 is provided, which is separated from the working chamber 16 by a dividing wall 20 and is delimited by a compensation diaphragm 22. The working chamber 16 and the compensation chamber 18 are filled with a fluid 24 and connected to each other via a damping duct 26 incorporated into the dividing wall 20.

The dividing wall 20 has a diaphragm 28 accommodated in a manner capable of oscillating. The diaphragm 28 is associated with a chamber 30 in which a cylindrical foam element 32 is accommodated. The chamber 30 is molded into a cup 34 accommodating the compensation chamber. The diaphragm 28 covers the chamber 30 at an end face of the chamber 34.

The foam element 32 fills the chamber 30 completely. In this case, the foam element 32 rests against all sides of the chamber 30 as well as against the diaphragm 28. However, the foam element 32 is not attached to the diaphragm. The foam element 32 rests against the diaphragm 28 in the area which is capable of oscillating during the operation of the hydraulically damping mount.

Oscillations acting on the hydraulically damping mount 10 are absorbed by the supporting spring 12 and cause the working chamber 16 to become larger or smaller. Thus, a hydraulic pressure 16 is built up in the working chamber. For the set frequency range, the pressure built up in the working chamber 16 is transmitted onto the diaphragm 28. However, the foam element 32 rests against the diaphragm 28 in the chamber 30 and supports the former. Together, the foam element 32 and the diaphragm 28 have a stiffness that is high enough for forcing the fluid 24 through the damping duct 26 and produce a damping action. In this case, however, the stiffness is comparatively low in order thus to set the dynamic overall stiffness to a value similar to the state without a damping action.

Figure 2:
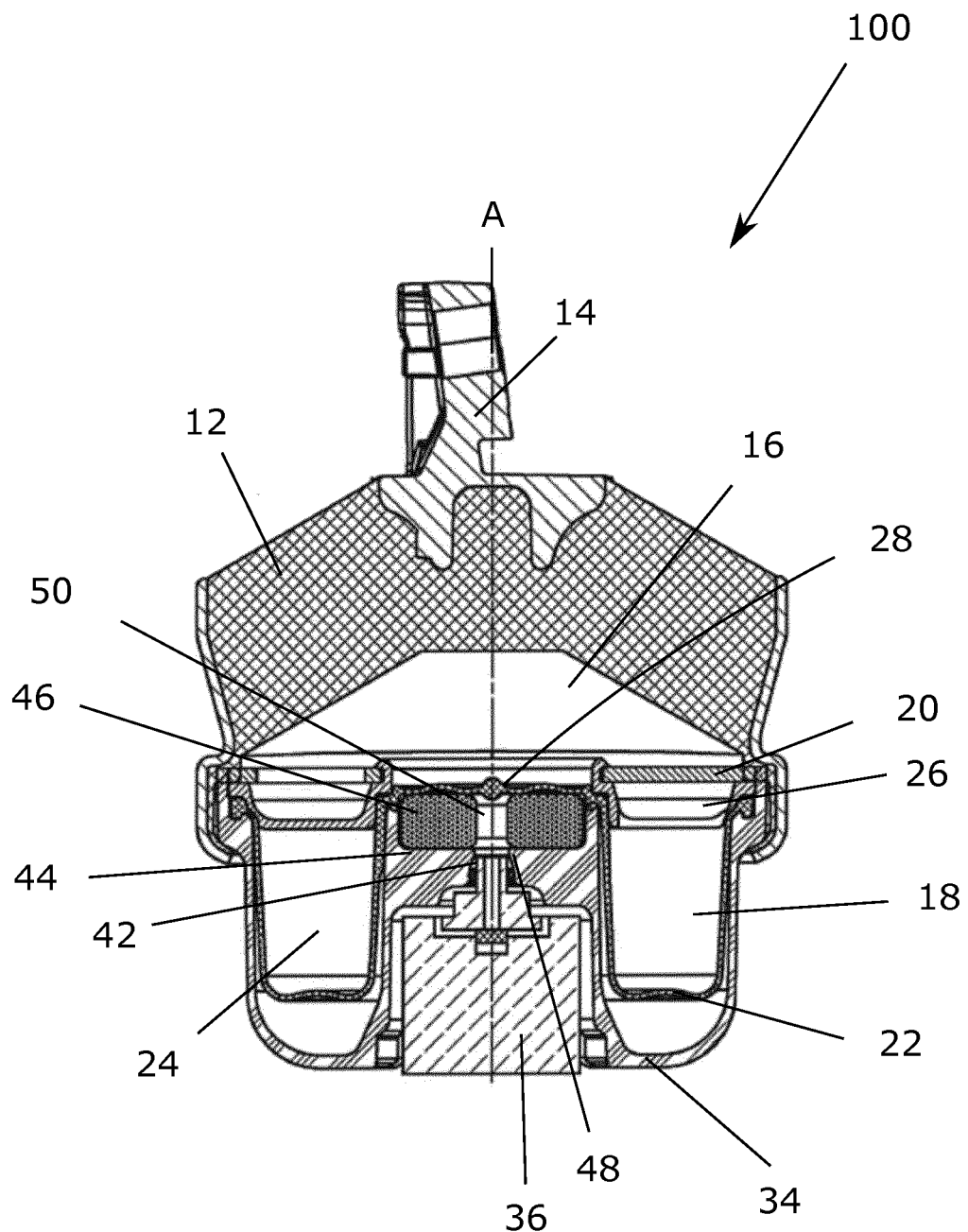
FIG. 2 shows a cross-sectional view of another exemplary embodiment of the hydraulically damping mount.

FIG. 2 shows another embodiment of the hydraulically damping mount according to the invention.

The hydraulically damping mount 100 has a chamber 44 which, in the radial direction and centrally on the side facing away from the diaphragm 28, has an opening 48 associated with a switch valve 42. In the open position of the switch valve 42, air 36 can be introduced from the outside into the chamber 44.

Furthermore, the hydraulically damping mount 100 has a hollow-cylinder-shaped foam element 46 with a passage 50. The passage 50 is disposed centrally in the radial direction and extends axially to the foam element 46, along the axis A.

Also in this embodiment, oscillations acting on the hydraulically damping mount 100 are absorbed by the supporting spring 12 and cause the working chamber 16 to become larger or smaller. Thus, hydraulic pressure is built up in the working chamber 16. For the set frequency range, the pressure built up in the working chamber 16 is transmitted onto the diaphragm 28. However, the foam element 46 rests against the bottom of the diaphragm 28 in the chamber 44 and supports the former. Together, the foam element 46 and the diaphragm 28 have a stiffness that is high enough for forcing the fluid 24 through the damping duct 26 and produce a damping action.

The diaphragm 28 is supported by the foam element 46 in such a way that the foam element 46 is compressed by the diaphragm 28 oscillating. The foam element 46 is compressed in such a way, when the diaphragm 28 oscillates, that an empty space is created in the chamber 30. During the course of the oscillation, this space becomes larger in a radially outward direction as well as axially, in the direction of the oscillation of the diaphragm 28.

The space created by the oscillating diaphragm 28 in the chamber 44 can be filled with air 36 by means of the passage 50 of the foam element 46, which is disposed centrally in the radial direction and extends axially. For a short time, this decouples the diaphragm 28 from the foam element 46 and thus reduces the stiffness of the system diaphragm/foam element. Thus, the dynamic overall stiffness of the hydraulically damping mount 100 can be reduced.

The invention claimed is:

1. A hydraulically damping mount for mounting a motor vehicle unit comprises:
   a supporting spring, the supporting spring supporting a mount core and surrounding a working chamber; and
   a compensation chamber separated from the working chamber by a dividing wall and comprising a compensation diaphragm,
   wherein the compensation chamber and the working chamber are filled with a fluid and are connected to each other by a damping duct incorporated into the dividing wall; the dividing wall has a decoupling diaphragm configured to oscillate; and a foam element is associated with the decoupling diaphragm, supports the decoupling diaphragm, and is compressed by the decoupling diaphragm oscillating.

2. The hydraulically damping mount according to claim 1, wherein the foam element is accommodated in a foam element chamber.

3. The hydraulically damping mount according to claim 2, wherein the foam element chamber is sealed at one end face by the decoupling diaphragm.

4. The hydraulically damping mount according to claim 1, wherein the foam element-comprises a closed-cell foam.

5. The hydraulically damping mount according to claim 1, wherein the foam element-comprises a polyurethane foam.

6. The hydraulically damping mount according to claim 1, wherein the foam element-comprises a micro-cellular foam (MCU).

7. The hydraulically damping mount according to claim 1, wherein the foam element is formed with a shape of a hollow cylinder.

8. The hydraulically damping mount according to claim 1, wherein one or more damping properties of the mount can be adjusted by modifying or adjusting a hardness of the foam element.

9. The hydraulically damping mount according to claim 8, wherein a Shore hardness of the foam element is modified or adjusted.

10. The hydraulically damping mount according to claim 1, wherein the motor vehicle unit comprises a motor vehicle engine for mounting on a motor vehicle body.

11. The hydraulically damping mount according to claim 1, wherein an opening associated with a switch valve is provided on the foam element chamber.

12. A hydraulically damping mount for mounting a motor vehicle unit comprises:

a supporting spring, the supporting spring supporting a mount core and surrounding a working chamber; and a compensation chamber separated from the working chamber by a dividing wall and comprising a compensation diaphragm, wherein the compensation chamber and the working chamber are filled with a fluid and are connected to each other by a damping duct incorporated into the dividing wall; the dividing wall has a decoupling diaphragm configured to oscillate; a foam element is associated with the decoupling diaphragm and supports the decoupling diaphragm in the event of a deflection; and an opening associated with a switch valve is provided on the foam element chamber.

\* \* \* \* \*